United States Patent [19]

Stager

[11] 4,195,815
[45] Apr. 1, 1980

[54] BIDIRECTIONAL VALVE FOR CRYOGENIC FLUIDS

[75] Inventor: Francis W. Stager, Stafford Springs, Conn.

[73] Assignee: Litton Industrial Products, Inc., East Hartford, Conn.

[21] Appl. No.: 910,603

[22] Filed: May 30, 1978

[51] Int. Cl.² .............................................. F16K 1/22
[52] U.S. Cl. .................................. 251/306; 277/26; 277/165; 251/173
[58] Field of Search ............... 251/306, 171, 173, 172, 251/174; 277/26, 165

[56] References Cited

U.S. PATENT DOCUMENTS

| 3,056,575 | 10/1962 | Mooney | 251/172 |
| 3,127,182 | 3/1964 | Wardleigh | 277/26 |
| 3,399,863 | 9/1968 | Fawkes | 251/306 |
| 3,404,864 | 10/1968 | Reddy | 251/174 X |
| 3,512,789 | 5/1970 | Tanner | 277/26 |
| 3,583,668 | 6/1971 | Nellmorkka | 251/306 X |
| 3,642,248 | 2/1972 | Benware | 251/172 |
| 3,920,036 | 11/1975 | Westenrieder | 251/174 X |
| 4,130,285 | 12/1978 | Whitaker | 251/173 X |

*Primary Examiner*—Harold W. Weakley
*Attorney, Agent, or Firm*—Brian L. Ribando

[57] ABSTRACT

A bidirectional butterfly valve comprising sealing means for a movable valve member in the form of a seating ring and retaining means therefor cooperatively configured to maintain bidirectional axial sealing engagement with the retaining means and radial sealing engagement with the movable valve member at normally encountered or cryogenic temperatures.

5 Claims, 4 Drawing Figures

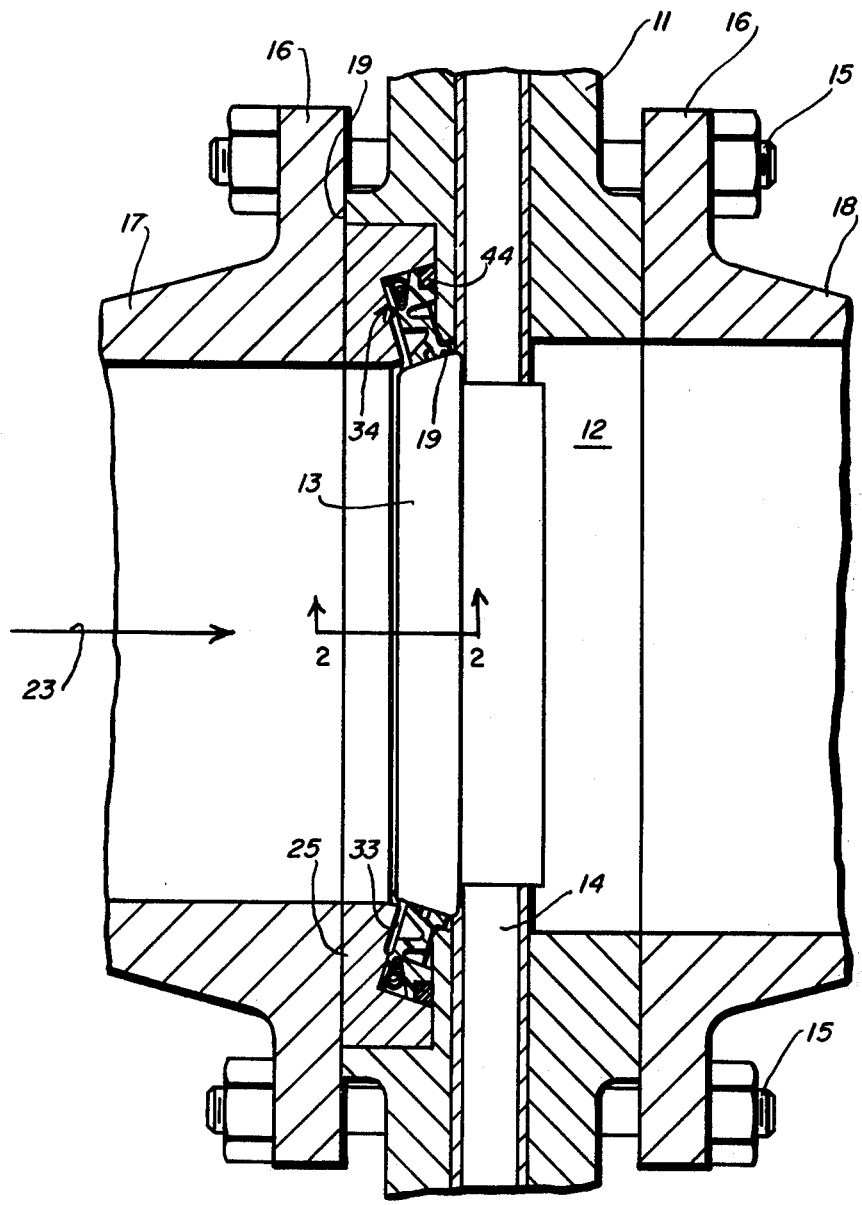
Fig_1

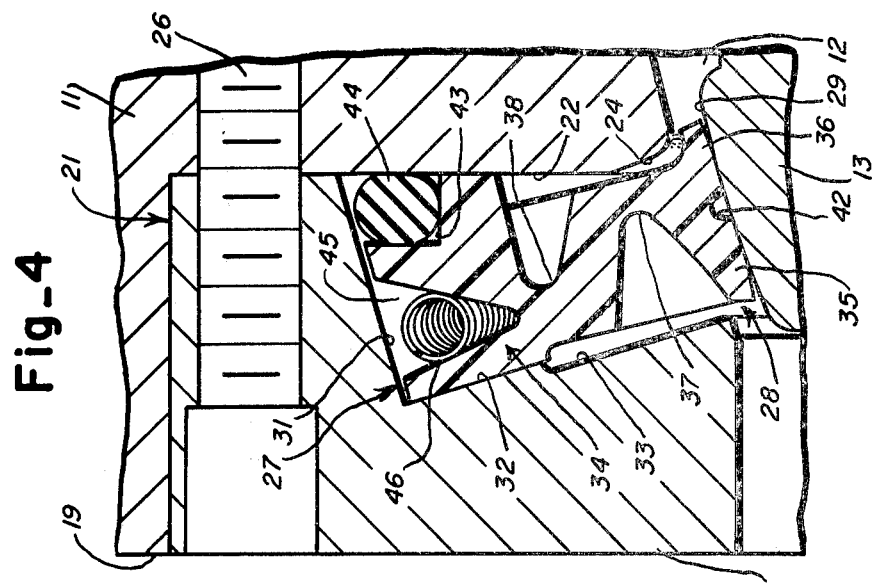
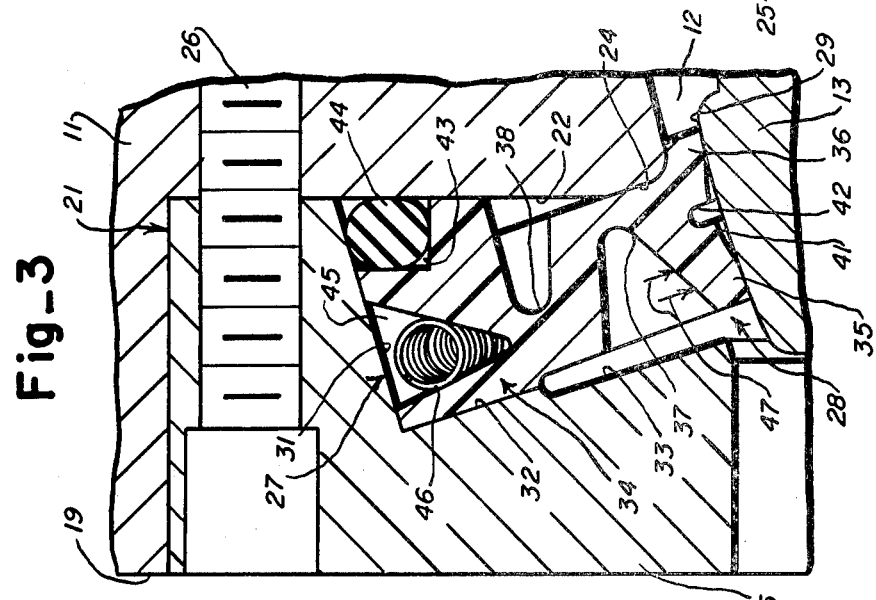
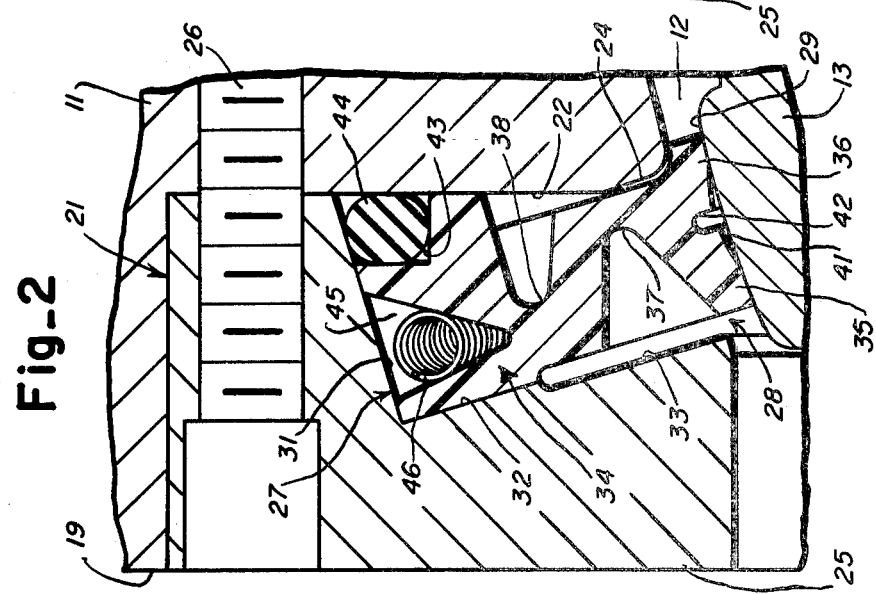

BIDIRECTIONAL VALVE FOR CRYOGENIC FLUIDS

This invention relates to valves; more particularly, it relates to butterfly valves having bidirectional sealing means for maintaining effecting sealing engagement with the movable butterfly valving element at all temperatures; and specifically, it relates to butterfly valves wherein the sealing means includes a seating ring and retainer means therefor cooperatively configured to maintain bidirectional sealing engagement at normal and cryogenic temperatures.

Valves designed for use in applications where the fluids to be controlled are within a normal range of temperatures are generally not suitable for controlling fluids at cryogenic temperatures due to overall shrinkage and particularly axial shrinkage of seating rings comprising the sealing means, and consequent leakage through the recess in the valve body wherein the seating rings are axially sealingly retained and supported.

In commonly assigned application Ser. No. 574,570, filed May 5, 1973, for PRESSURE ACTUATED RESILIENT VALVE SEAL, the radially outermost base portion of the seating ring is axially sealingly compressed in wedge-shaped retaining recess in the valve assembly and has a radial dimension greater than the distances from the radially outermost or back wall of the recess to the valving element sealing surface such that the seating ring is under radial compression.

In cryogenic applications, overall shrinkage of the seating ring of the above application on exposure to cryogenic temperatures will result in radial shrinkage and reduction of the internal diameter of the seating ring causing increased radial pressure on the valving element. Radial shrinkage will also cause the base portion to shrink radially inwardly into the wedge and tend thereby to accommodate axial shrinkage such that the axial compressive seal of the base portion of the sealing ring against opposite walls of the recess is maintained. However, this result is not generally obtained due to the fact that seating ring materials generally employed, such as polytetrafluoroethylene (TFE) or polyhexafluoropropylene (FEP), can have varying temperature coefficients of contraction from batch to batch and designing wedge and seating ring angles to accommodate these variables is not practicable.

In accordance with the present invention, sealing means are provided which provide effective sealing at all temperatures. The problem is solved in the provision of a seating ring formed with a circumferential V groove in its radially outermost or base portion which opens to the radially outermost or back wall of a seating ring recess to accommodate a circular closely coiled metal spring whose normal mean diameter is slightly less than the mean diameter of the V groove whereby when mounted the spring diameter expands to the mean diameter of the V groove. The coil diameter of the spring is equivalent to the spacing of the V groove walls at the mean diameter of the V groove.

When the seating ring and spring are assembled in the seating ring recess resulting in axial compression of the base portion, the spring applies a reactive force to maintain axial sealing contact of base portion with the recess walls. Thus, when the seating ring experiences cyrogenic temperatures resulting in axial and radial shrinking, and moves radially inwardly into the recess, the spring follows or moves with the radially and axially shrinking V groove walls to maintain the spacing of the V groove walls and thus to maintain the base portion in axial sealing contact with opposing walls of the recess to preclude leakage between inlet and outlet sides through the recess 28. Valves in accordance with the invention seal against pressures from 0 to 300 psi at atemperatures from −320° to +120° F.

Further, in accordance with the invention, the surface of the seating ring facing the valving element has a large radius centrally located circumferential groove and a deeper smaller radius centrally located groove. The result is that two spaced sealing lips to either side of the grooves bear on the surface of the valving element. The large and small grooves give the seating portion of the seating ring bearing against the valve element a spring characteristic which enhances sealing and reduces torque requirements.

An object of the invention is to provide a butterfly valve having sealing means of simple low cost configuration capable of providing sealing at normal and cryogenic temperatures.

Other objects and many of the attendant advantages of this invention will readily be appreciated as the same becomes better understood by reference to the following detailed description when considered in connection with the accompanying drawing in which like reference numerals designate like or corresponding parts throughout the figures thereof and wherein:

FIG. 1 is a vertical central cross-sectional view of a mounted butterfly valve showing the disc valving element in valve closed position;

FIG. 2 is a cross-sectional view taken along lines 2—2 of FIG. 1 under zero pressure condition;

FIG. 3 is a cross-sectional view similar to FIG. 2 showing the accommodation of the valve elements to dynamic pressure conditions from the left at normal temperatures; and FIG. 4 is a cross-sectional view similar to FIG. 2 showing the accommodation of the valve elements to dynamic pressure conditions from the right at cryogenic temperatures.

Referring now to the drawing wherein like reference numerals designate like or corresponding elements throughout the several views, there is shown in FIG. 1 a butterfly valve assembly comprising a valve body 11 having a central flow passageway 12 and a valving element in the form of a disc 13 comprising a segment of a sphere and shown in closed position. The larger diameter side of the disc 13 is secured to a valve control shaft 14 which is rotatably mounted in the valve body 11. The axis of rotation of the shaft 14 is central to the axis of the sphere of which the disc 13 is a segment. The butterfly valve assembly is adapted to be secured in a fluid flow line as by bolts 15 extending through the body and through flanges 16 of piping 17, 18 to either side of the valve body 11, or by other equivalent means.

With reference to FIG. 1 and to enlarged FIGS. 2-4, the left face 19 of the valve body 11 from the passageway radially outwardly is cut out to provide an annular axially extending groove generally designated by reference numeral 21 which has an axially facing wall portion 22 which extends perpendicularly to the axis 23 of the flow passageway 12 a substantial distance, and which merges with a wall portion 24 which extends obliquely to the right the remaining distance to the flow passageway 12.

A seating ring retainer ring 25 adapted to be secured within the annular groove 21 of and flush with the left side 19 of the valve body 11, as by bolts 26, is formed with a rightwardly canted or oblique annular groove generally designated by reference numeral 27 on the side facing the annular groove 21 in the valve body 11 thereby to define a recess, generally designated by reference numeral 28, which opens radially obliquely toward the flow passageway 12 in a direction substantially perpendicular to the sealing surface 29 of the valve disc 13.

The recess 28 is defined by a back or radially outermost wall 31 and opposing walls 32, 22 which converge radially inward from the back wall 31 to approximately midway of the recess 28 to form a radially inwardly directed wedge portion. Radially inward from the wedge portion, wall 32 is cut back as at 33 to form a wider recess to terminate the wedge portion and, toward the opening of the recess 28, walls 33 and 24 diverge away from one another.

A resilient seating ring, generally designated by reference numeral 34, is located in the recess 28 and has a base or radially outermost portion of wedge shape held in axial compression between the opposing walls 32, 22 defining the wedge portion of the recess 28. The overall radial dimension of the seating ring 34 is such that spaced seating surfaces 35, 36 thereof are in radial compressive engagement with the sealing surface 29 of the disc 13.

The seating ring 34 is preferably formed from polyhexafluoropropylene (FEP) resins, popularly known as Kel F. The wedge-shaped base portion of the seating ring 34 is axially dimensioned so that the axial compressive force exerted on the wedge portion of the recess 28 is sufficient to provide effective axial sealing yet allow radial shrinkage movement. The seating ring 34 also has a generally straight intermediate web portion defined by generally axially oppositely extending and radially spaced grooves 37, 38, and a flared out radially innermost seating portion having the seating surfaces 35, 36 directly facing and engaging the sealing surface 29 of the disc 13.

In accordance with the invention, the spaced seating surfaces 35, 36 engaging the sealing surface 29 of the disc 13 are separated by a centrally located large radius circumferential groove 41 and a deeper smaller radius circumferential groove 42 extending radially outwardly and centrally located with respect to the larger radius groove 41. As viewed in FIG. 2, this formation provides spaced seating lips 35, 36 in engagement with the sealing surface 29 of the valve disc 13, which, in combination with the large and small grooves 41, 42, provides a spring characteristic to the seating portion of the ring 34.

The base portion of the seating ring 34 is also formed with an annular O-ring notch 43 in the radially outermost right corner of the base portion as viewed in the Figures. An O-ring 44 of resilient material having a coefficient of contraction similar to that of Kel F is held under compression in the space defined by the walls of the notch and the wall 33 of the recess 28. O-ring 44 serves to provide a secondary safeguard against leakage through the recess 28.

In accordance with the invention, the base portion of the seating ring 34 is formed with a circumferential V-groove 45 which opens toward the back wall 31 of the recess 28. A closely spirally coiled circular garter spring 46 of stainless steel or equivalent material is mounted within the V-groove 45. The normal unstressed mean diameter of the spring 46 is chosen to be on the order of 10% less than the mean diameter of the V-groove so that when mounted in the V-groove the mean diameter of the spring expands to the mean diameter of the V-groove. Also, the diameter of the spring coils is equivalent to the spacing between the V-groove walls at the mean diameter of the V-groove. The radial force applied by the expanded spring 46 has insignificant effect on the radial sealing contact of the seating ring 34 against the valve element 13. The primary function of the spring 46 is to exert a reactive force to the axial compression of the base portion of the seating ring 34 between the recess walls to maintain axial sealing contact. Thus, it serves to maintain the normal spacing of the V-groove walls and prevent movement thereof in an axial direction toward one another under axial compressive forces as would cause separation of and loss of the sealing between the opposing surfaces of the base portion of the walls 32, 33 of the recess 28.

FIG. 3 shows the valve disc 13 closed against fluid flow from the left under non-cryogenic temperature conditions. By reason of the diverging portion of the recess 28, the flow is permitted to enter into axial groove 37 in the straight intermediate portion of the seating ring 34 to shift the radially innermost or flared seating portion of the seating ring to the right against wall portion 24 as permitted by the clearance therebetween to maintain radial sealing contact and also to enhance radial sealing by pressure acting on the seating portion as illustrated by arrows 47 in FIG. 3. The increased radial sealing pressure exerted by line pressure in groove 37 causes the groove 41 to flatten somewhat and increase sealing area.

FIG. 4 shows the valve disc 13 closed against flow from the right at cryogenic temperatures, e.g. on the order of −320° F. Under these temperature conditions, the overall dimensions of the FEP seating ring 34 will shrink, reducing the internal diameter of the seating ring 34 and thereby increasing radial sealing pressure which is further enhanced by fluid entering the axial groove 38 in the web portion of the ring 34. The increased radial sealing pressure is accommodated without impairing sealing action with the disc 13 by the flexibility provided by the grooves 41, 42 between seating surfaces 35, 36 which, as viewed in FIG. 4, flatten out to accommodate increased radial pressure.

At cryogenic temperatures, the overall shrinkage of the seating ring 34 will also result in radially inward movement of the wedge-shaped base portion of the seating ring 34 into the wedge portion of the recess and compensate for axial shrinkage of the ring 34. Axial sealing is maintained and assured, in that, notwithstanding that the V-notch 43 will also shrink causing the walls therof to separate, the spiral spring 44 will follow, i.e. its diameter will decrease as the V-groove mean diameter shrinks, and by following, maintain the opposing V-groove walls at the same separation, thus resisting separation of axial sealing contact of the base portion within the wedge portion of the recess 28 as would cause leakage around the base portion of the seating ring 34.

The invention claimed is:

1. A valve assembly comprising
   a stationary valve body having a passageway for fluid,
   a movable valve member supported in said valve body adapted to close said passageway, a recess in the valve body opening radially toward said passageway generally perpendicular to the sealing surface of said valve member, said recess being defined by a radially outermost wall and by opposing side walls radially inwardly converging from said radially outermost wall, a seating ring having a radially outermost wedge-shaped base portion with axially facing sealing surfaces compressed between said opposed converging side walls of said recess, and a radially innermost seating portion extending into said passageway in radial compressive sealing engagement with the sealing surface of said valve member, said wedge-shaped base portion intermediate said sealing surfaces having a V-groove opening toward the radially outermost wall of said recess, and a coiled circular spring mounted in said V-groove for maintaining the axial spacing of the walls of said V-grooves at all temperatures with negligible radial loading of said seating ring, said coiled spring having a normal unstressed mean diameter slightly less than the mean diameter of said V-groove above cryogenic temperatures, and the coil diameter of said spring being equal to the spacing of the walls defining said V-groove at the mean diameter thereof above cryogenic temperatures whereby the mean diameter of the spring coincides with the mean diameter of said V-groove, and whereby incident to shrinkage of said seating ring upon exposure to cryogenic temperatures and a reduction in the mean diameter of said V-groove the mean diameter of the spring will contract to the reduced mean diameter of said V-groove thereby to maintain axial sealing contact of said base portion of said seating ring between opposing side walls of said recess.

2. A valve assembly as recited in claim 1,
said seating ring having an intermediate portion between said base and seating portions, said intermediate portion having grooves facing opposing side walls of said recess.

3. A valve assembly as recited in claim 1, said seating portion facing the sealing surface of said valve member having a central circumferential groove to thereby define spaced seating surfaces.

4. A valve assembly as recited in claim 3, said seating portion facing the sealing surface of said valve element having a second central circumferential groove of smaller radius opening toward the sealing surface of said valve element.

5. A valve assembly as recited in claim 1 wherein said base portion has an annular corner groove opening toward the bottom and one side wall of said recess, and an O-ring mounted in said corner groove.

* * * * *